US010754911B2

(12) United States Patent
Liang et al.

(10) Patent No.: US 10,754,911 B2
(45) Date of Patent: Aug. 25, 2020

(54) SYSTEMS AND METHOD FOR CONTENT PRESENTATION

(71) Applicant: Facebook, Inc., Menlo Park, CA (US)

(72) Inventors: Xiaojun Liang, San Jose, CA (US); Varun Kacholia, Sunnyvale, CA (US); Maher Afif Saba, Seattle, WA (US); Mahmud Sami Tas, Mountain View, CA (US); Gang Liu, Saratoga, CA (US)

(73) Assignee: Facebook, Inc., Menlo Park, CA (US)

( * ) Notice: Subject to any disclaimer, the term of this patent is extended or adjusted under 35 U.S.C. 154(b) by 888 days.

(21) Appl. No.: 14/873,717

(22) Filed: Oct. 2, 2015

(65) Prior Publication Data

US 2017/0097741 A1 Apr. 6, 2017

(51) Int. Cl.
*G06F 16/957* (2019.01)
*G06F 3/0482* (2013.01)
*H04L 29/06* (2006.01)

(52) U.S. Cl.
CPC ........ *G06F 16/9574* (2019.01); *G06F 3/0482* (2013.01); *H04L 65/60* (2013.01)

(58) Field of Classification Search
CPC ............. G06F 17/30902; G06F 3/0482; G06F 3/04842; G06F 17/30899; G06F 17/30828; G06F 3/0485; G06F 3/165; G06F 16/9574; H04L 65/60; H04L 29/06; H04L 29/08072; H04L 61/2007; H04L 69/329; H04N 21/2668; H04N 21/4316; H04N 21/4438; H04N 21/4532; H04N 5/44543; H04N 21/23424; H04N 21/23617; H04N 21/2387; H04N 21/2393; H04N 21/2407; H04N 21/2541; H04N 21/2543; H04N 21/25875; H04N 21/25891; H04N 21/26266; H04N 21/2665; H04N 21/4314; H04N 21/4331; H04N 21/44; H04N 21/44204; H04N 21/4622; H04N 21/4627; H04N 21/47; H04N 21/47202; H04N 21/47205; H04N 21/4725; H04N 21/4756; H04N 21/4782; H04N 21/4786; H04N 21/482; H04N 21/4821; H04N 21/4826; H04N 21/6125; H04N 21/6175; H04N 21/6377; H04N 21/64322; H04N 21/6547; H04N 21/8113;
(Continued)

(56) References Cited

U.S. PATENT DOCUMENTS 8,566,722 B2 * 10/2013 Gordon .............. H04N 21/2665
715/721
8,826,153 B2 * 9/2014 Roskind ............ G06F 17/30902
709/223
(Continued)

*Primary Examiner* — Andrew L Tank
(74) *Attorney, Agent, or Firm* — Sheppard Mullin Richter & Hampton LLP

(57) ABSTRACT

Systems, methods, and non-transitory computer-readable media can provide a content feed through a display interface. The content feed can include at least a snippet of a first content item that is associated with a preview time threshold. A determination can be made that the snippet of the first content item has been positioned within a viewport region of the display interface for a duration of time that satisfies the preview time threshold. Data associated with the first content item can be obtained from a content distribution system. The data associated with the first content item can be stored.

20 Claims, 8 Drawing Sheets

(58) Field of Classification Search
CPC .. H04N 21/812; H04N 21/8133; H04N 21/84; H04N 21/8456; H04N 21/8543; H04N 21/858; H04N 21/8586; H04N 5/4448; H04N 5/44591; H04N 7/17318
See application file for complete search history.

(56) References Cited

U.S. PATENT DOCUMENTS

| | | | |
|---|---|---|---|
| 2006/0236362 A1* | 10/2006 | Istvan | G06F 3/0482 725/135 |
| 2008/0086755 A1* | 4/2008 | Darnell | H04N 5/44543 725/105 |
| 2011/0173569 A1* | 7/2011 | Howes | G06F 17/30902 715/835 |
| 2012/0144343 A1* | 6/2012 | Tseng | G06F 3/0482 715/834 |
| 2014/0115114 A1* | 4/2014 | Garmark | H04L 65/60 709/219 |
| 2015/0358689 A1* | 12/2015 | Wen | H04N 21/235 725/32 |

* cited by examiner

SYSTEMS AND METHOD FOR CONTENT PRESENTATION

FIELD OF THE INVENTION

The present technology relates to the field of content presentation. More particularly, the present technology relates to techniques for presenting content items through computing devices.

BACKGROUND

Today, people often utilize computing devices (or systems) for a wide variety of purposes. Users can operate their computing devices to, for example, interact with one another, create content, share content, and access information. Under conventional approaches, content items (e.g., images, videos, audio files, etc.) can be made available through a content sharing platform. Users can operate their computing devices to access the content items through the platform. Typically, the content items can be provided, or uploaded, by various entities including, for example, content publishers and also users of the content sharing platform. In some instances, the content items can be categorized and/or curated.

SUMMARY

Various embodiments of the present disclosure can include systems, methods, and non-transitory computer readable media configured to provide a content feed through a display interface. The content feed can include at least a snippet of a first content item that is associated with a preview time threshold. A determination can be made that the snippet of the first content item has been positioned within a viewport region of the display interface for a duration of time that satisfies the preview time threshold. Data associated with the first content item can be obtained from a content distribution system. The data associated with the first content item can be stored.

In an embodiment, systems, methods, and non-transitory computer readable media can be configured to receive a selection of the snippet of the first content item and present the first content item through the display interface based at least in part on the stored data associated with the first content item.

In an embodiment, the preview time threshold is determined based at least in part on a likelihood that a user operating the computing device will select the snippet of the first content item to access the first content item.

In an embodiment, the preview time threshold for the first content item is determined with respect to a user operating the computing device.

In an embodiment, the content feed includes a snippet of a second content item that is associated with a second preview time threshold, wherein the second preview time threshold is different from the preview time threshold associated with the first computing device.

In an embodiment, the data is obtained prior to the first content item being accessed.

In an embodiment, systems, methods, and non-transitory computer readable media can be configured to determine that the data associated with the first content item is used least recently among other stored data associated with different content items and remove the data associated with the first content item from storage.

In an embodiment, systems, methods, and non-transitory computer readable media can be configured to determine that the data associated with the first content item has been stored for a threshold period of time and remove the data associated with the first content item from storage.

In an embodiment, the viewport region is defined by a specified set of pixel coordinates that correspond to the display interface.

In an embodiment, systems, methods, and non-transitory computer readable media can be configured to determine a type of data connection through which the content feed is being accessed and adjust a rate of obtaining data associated with content items prior to the content items having been accessed through the computing device.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
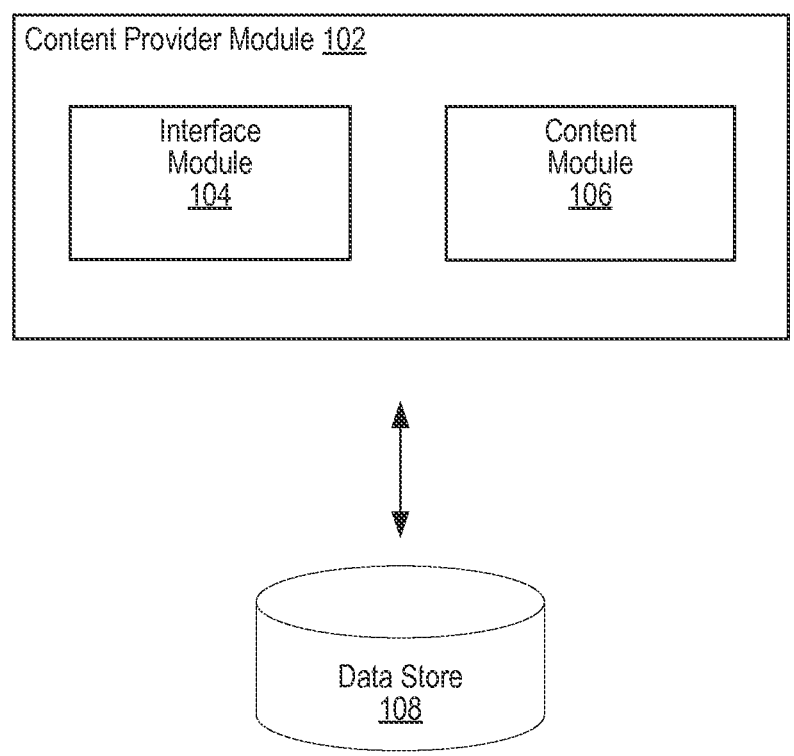
FIG. 1 illustrates an example system including an example content provider module configured to provide content to users, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Content Presentation

People use computing devices (or systems) for a wide variety of purposes. As mentioned, under conventional approaches, a user can utilize a computing device to share content items (e.g., documents, images, videos, audio, etc.)

with other users. Under conventional approaches, content items (e.g., web pages, text, articles, images, videos, audio files, etc.) can be made available through a content sharing platform (e.g., a social networking system). Users can operate their computing devices to access the content items through the platform. Typically, the content items can be provided, or uploaded, by various entities including, for example, content publishers and also users of the content sharing platform.

In some instances, a user operating a computing device can interact with a content provider interface (e.g., a software application running on the computing device, web browser, etc.) to access content items. Such content items can be presented through the interface as part of a content feed, for example. In such instances, instead of displaying the content items in their entirety, the interface may provide a respective portion or snippet (e.g., title, summary, text excerpt, images, frames, etc.) of each of the content items and this snippet can link to the respective content item in full. Thus, the user can select the snippet of a content item in the feed to access the content item in its entirety. In one example, the content item may be a web page corresponding to a news article that is hosted, or provided, by a content publisher system. In this example, a snippet of the news article may be included in the content feed. Once the user selects (e.g., accesses) the snippet of the news article in the content feed, the news article may be presented through the interface in its entirety.

In some instances, there may be a lag, or delay, that results in presenting the entire content item through the interface. Such lag may result from the computing device having to obtain data (e.g., web page files, JavaScript files, images, etc.) associated with the content item through the content publisher system that is hosting or providing the content item before the content item can be presented. These types of delays in accessing content items can degrade the user experience and may result in users no longer wanting to view content items due to an unacceptable lag time. Accordingly, such conventional approaches can be inconvenient to users and may not be effective in addressing these and other problems arising in computer technology.

An improved approach rooted in computer technology overcomes the foregoing and other disadvantages associated with conventional approaches specifically arising in the realm of computer technology. In various embodiments, a user operating a computing device can interact with the content provider interface to access various content items. As mentioned, respective snippets of the content items may be presented through the interface as part of a content feed. In some instances, users can navigate (e.g., browse) the content feed, for example, by scrolling or performing some gesture through a display screen of the computing device, to access the different content items that are available in the content feed. In some embodiments, content items in a content feed can be associated with respective preview time thresholds (e.g., a specified number of milliseconds, seconds, or some other measurable unit of time). In some embodiments, the preview time threshold for a content item is the amount of time that needs to elapse while the content item is within a viewport region of the interface until data associated with the content item is automatically pre-fetched, or downloaded, and stored on the computing device. The preview time threshold for a given content item may be determined based, in part, on a probability, or likelihood, that the user will select (e.g., access) the content item, for example. Once pre-fetching is complete, when the user selects the snippet of the content item in the content feed, the computing device can present the content item through the interface using the pre-fetched content item data rather than downloading, or obtaining, the data through the content publisher system that is hosting, or providing, the content item. Such an improved approach helps eliminate, or reduce, the amount of lag that is typically associated with accessing content items and, as a result, allows for content items to be more quickly be presented to users.

FIG. 1 illustrates an example system 100 including an example content provider module 102 configured to provide content items to users, according to an embodiment of the present disclosure. As shown in the example of FIG. 1, the content provider module 102 can include an interface module 104 and a content module 106. In some instances, the example system 100 can include at least one data store 108. The components (e.g., modules, elements, etc.) shown in this figure and all figures herein are exemplary only, and other implementations may include additional, fewer, integrated, or different components. Some components may not be shown so as not to obscure relevant details.

In some embodiments, the content provider module 102 can be implemented, in part or in whole, as software, hardware, or any combination thereof. In general, a module, as discussed herein, can be associated with software, hardware, or any combination thereof. In some implementations, one or more functions, tasks, and/or operations of modules can be carried out or performed by software routines, software processes, hardware, and/or any combination thereof. In some cases, the content provider module 102 can be implemented, in part or in whole, as software running on one or more computing devices or systems, such as on a user computing device or client computing system. For example, the content provider module 102, or at least a portion thereof, can be implemented as or within an application (e.g., app), a program, or an applet, etc., running on a user computing device or a client computing system, such as the user device 710 of FIG. 7. Further, the content provider module 102, or at least a portion thereof, can be implemented using one or more computing devices or systems that include one or more servers, such as network servers or cloud servers. In some instances, the content provider module 102 can, in part or in whole, be implemented within or configured to operate in conjunction with a social networking system (or service), such as the social networking system 730 of FIG. 7. It should be understood that there can be many variations or other possibilities.

In various embodiments, the content provider module 102 can utilize the interface module 104 and the content module 106 to provide content items to users. The interface module 104 can be configured to provide an interface (e.g., graphical user interface) through which content items can be presented and accessed. For example, the interface can be provided through a software application running on a computing device being operated by a user. The user can interact with the interface, for example, by performing touch screen gestures through a display screen of the computing device. As mentioned, in some embodiments, content items can be presented through the interface as part of a content feed, which the user can navigate to access or play content items. More details regarding the interface module 104 will be provided below in reference to FIG. 2.

The content module 106 can be configured to provide various types of content items that can be presented to users through the interface provided by the interface module 104. The content items provided by the content module 106 may be categorized into one or more categories and/or be associated with one or more content feeds (e.g., channels). As mentioned, content items included in a content feed can be associated with respective preview time thresholds (e.g., a specified number of milliseconds, seconds, or some other measurable unit of time). In some embodiments, when a content item is positioned within a viewport region of the interface provided by the interface module 104, or a region corresponding to the display screen of the computing device, for a period of time that satisfies the preview time threshold associated with the content item, then the content module 106 can automatically pre-fetch, or download, data associated with the content item and can store the data on the computing device. When the user selects a pre-fetched content item, the content module 106 can cause the content item to be presented through the interface using the pre-fetched content item data rather than downloading, or obtaining, the data through the content publisher system that is hosting, or providing, the content item. More details regarding the content module 106 will be provided below in reference to FIG. 3.

In some embodiments, users can access respective content feeds that are customized for the user. For example, the content module 106 can train (and retrain) machine learning models for ranking content items for potential presentation in content feeds of users of a social networking system. For example, the content module 106 can divide its users into different sets based on various attributes of the users (e.g., age, interests, language, etc.) and can generate one or more models for each set of users. Users with different attributes may have different behavioral patterns that can reflect their interests in different topics reflected by content items. As a result, different models for ranking content items for different sets of users can provide more accurate ranking of content items and provide higher likelihood that users will be interested in the content items presented to them. In some embodiments, the features used to train the models can include interactions of users with content items of a content feed. Such interactions can include, for example, selecting a link in the content item, commenting on the content item, endorsing or "liking" the content item, sharing the content item with other entities (e.g., other users of the social networking system, social connections or "friends", etc.), and hiding the content item. The content module 106 can use the models for each set of users to determine levels of interest of a user in content items. The level of interest of a user in each topic can be indicated by a topic score. The social networking system can rank a content item for potential presentation to a user based on a topic(s) reflected by the content item and the topic score(s) of the user for the topic(s). Content items having a ranking that satisfies a selected threshold value can be presented to the user in her customized content feed. In some embodiments, the preview time thresholds for content items can be determined based at least in part on the ranking of the content items in the content feed and/or the topic score(s) for the user browsing the content feed.

In some embodiments, the content provider module 102 can be configured to communicate and/or operate with the at least one data store 108 in the example system 100. The at least one data store 108 can be configured to store and maintain various types of data. In various embodiments, the at least one data store 108 can store data relevant to function and operation of the content provider module 102. One example of such data is content items that are available for access through the interface provided by the interface module 104 as well as respective preview time thresholds for those content items. In some implementations, the at least one data store 108 can store information associated with the social networking system (e.g., the social networking system 730 of FIG. 7). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 108 can store information associated with users, such as user identifiers, user information, profile information, user specified settings, content produced or posted by users, and various other types of user data. It should be appreciated that there can be many variations or other possibilities.

Figure 2:
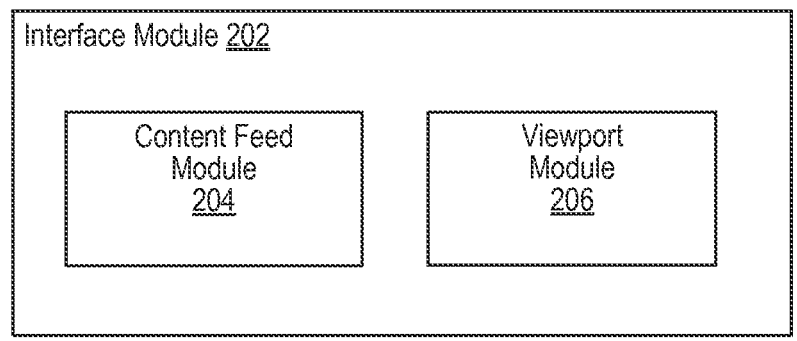
FIG. 2 illustrates an example of an interface module configured to provide an interface for accessing content items, according to an embodiment of the present disclosure.

FIG. 2 illustrates an example 200 of an interface module 202 configured to provide an interface for accessing content items, according to an embodiment of the present disclosure. In some embodiments, the interface module 104 of FIG. 1 can be implemented with the interface module 202. As shown in the example of FIG. 2, the interface module 202 can include a content feed module 204 and a viewport module 206.

As mentioned, the interface module 202 can be configured to provide an interface (e.g., graphical user interface) through which content items (e.g., images, videos, audio files, etc.) can be presented and accessed. In various embodiments, the interface module 202 can utilize a content feed module 204 that is configured to organize and present the content items in one or more content feeds.

In some implementations, a user can browse the different content items included in a content feed, for example, by scrolling and/or performing gestures (e.g., scroll gestures) to move the content feed up or down (or some other directions that facilitate browsing, such as left or right). In some embodiments, the viewport module 206 can be configured to determine when one or more content items included in a content feed are positioned within a viewport region of the interface. As mentioned, content items included in the content feed may be associated with respective preview time thresholds. In some embodiments, the viewport module 206 can cause content items positioned within the viewport region of the interface to be pre-fetched, or downloaded, as described in reference to FIG. 3. The viewport region may correspond to a pre-determined region of the interface and/or the display screen of the computing device on which the content feed is being accessed. For example, the viewport region may be defined by a specified set of pixel coordinates that correspond to the display screen of the computing device through which the interface is being accessed. Depending on the implementation, the pre-determined region may generally correspond to the top, middle, or bottom of the display screen. In some implementations, the pre-determined region may vary depending on the make, model, and/or type of computing device being used to access the interface.

Figure 3:
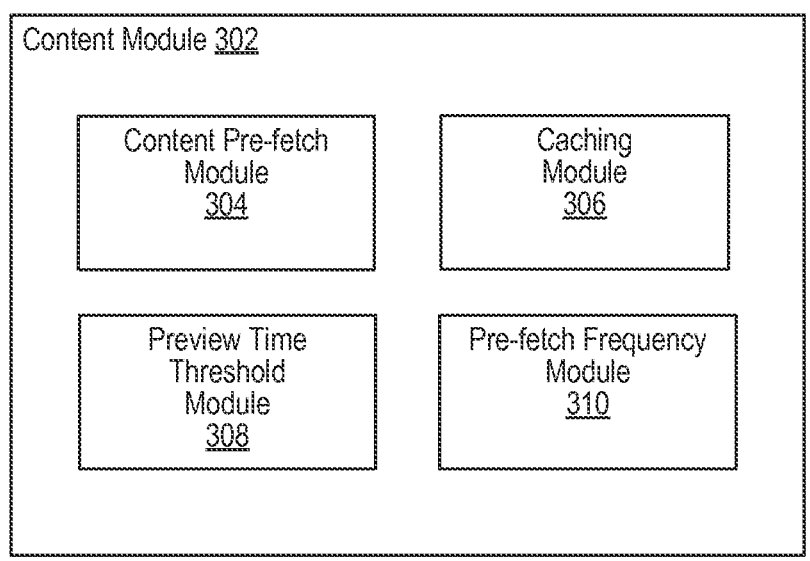
FIG. 3 illustrates an example of a content module configured to pre-fetch content items, according to an embodiment of the present disclosure.

FIG. 3 illustrates an example 300 of an content module 302 configured to pre-fetch content items, according to an embodiment of the present disclosure. In some embodiments, the content module 106 of FIG. 1 can be implemented with the content module 302. As shown in the example of FIG. 3, the content module 302 can include a content pre-fetch module 304, a caching module 306, a preview time threshold module 308, and a pre-fetch frequency module 310.

In various embodiments, the content pre-fetch module 304 can be configured to automatically pre-fetch data associated with content items. In some embodiments, the content pre-fetch module 304 pre-fetches data for any content items that are positioned within a viewport region for an amount of time that satisfies a respective preview time threshold associated with the content item. For example, a user operating a computing device may be browsing a content item that includes at least a first content item. The first content item may be associated with a preview time threshold of 2 seconds. In this example, if the first content item, or a snippet of the first content item, is positioned within the viewport region of the computing device for 2 or more seconds, then the computing device can be instructed to pre-fetch any data associated with the first content item even if the user has not attempted to access the first content item in its entirety. When the user operating the computing device actually selects, or attempts to access, the snippet of the content item included in the content feed, the content pre-fetch module 304 can present the content item through the interface using the pre-fetched content item data that is stored on the computing device, rather than downloading, or obtaining, the data from the content publisher system that is hosting, or providing, the content item.

Data associated with a content item can vary depending on the type of the content item. For instance, the content items may be articles that can include text (or markup language documents) and/or media (e.g., images, videos, audio, etc.). The content items may also be associated with executable code (e.g., JavaScript) and/or other static resources (e.g., Cascading Style Sheets or CSS). In some embodiments, data associated with a content item being pre-fetched can be downloaded in one or more stages. For example, an article being pre-fetched may be associated with a markup language document (e.g., HTML file), JavaScript and CSS resources, and images. In some embodiments, the content pre-fetch module 304 can pre-fetch any text or markup language documents when the duration of the content item in the viewport region satisfies the respective preview time threshold without downloading any of the other data associated with the content item. In some embodiments, in addition to pre-fetching any text or markup language documents, the content pre-fetch module 304 can also pre-fetch any executable code (e.g., JavaScript) and/or static resources (e.g., CSS files) associated with the content item without downloading any of the other data associated with the content item, such as media data (e.g., images, videos, audio, etc.). Further, in some embodiments, in addition to pre-fetching any text or markup language documents, executable code, and/or static resources associated with the content item, the content pre-fetch module 304 can also pre-fetch any media (e.g., images, videos, audio, etc.) associated with the content item being pre-fetched.

The caching module 306 can store data associated with content items that are pre-fetched, for example, in a data store associated with the computing device on which the content module 302 is implemented. Since such data stores are typically limited in the amount of available storage space, in some embodiments, the caching module 306 can be configured to manage the storage of pre-fetched content item data in a number of ways. In one example, the caching module 302 may utilize a Least Recently Used (LRU) algorithm to remove, or delete, data associated with content items that were the least recently used or accessed on the computing device. In another example, the caching module 306 can utilize a time to expire approach for managing the storage of pre-fetched content items. In this example, data associated with content items that were pre-fetched can expire, or be deleted, once a threshold time period (e.g., a threshold number of minutes, hours, days, or any other measurable period of time) has elapsed.

In various embodiments, the preview time threshold module 308 can be configured to obtain and associate respective preview time thresholds for content items. Thus, each content item can be associated with its own preview time threshold. Further, the preview time threshold for a given content item can also be adjusted based on the user. Thus, a preview time threshold for a first content item may be 2 seconds for a user A but 5 seconds for a user B. Thus, for example, data for the first content item can be pre-fetched when the snippet of the first content item is positioned within a viewport region corresponding to user A for 2 seconds. In contrast, data for the first content item can be pre-fetched when the snippet of the first content item is positioned within a viewport region corresponding to user B for 5 seconds.

In various embodiments, the preview time threshold for a content item can be determined, in part, on a probability, or likelihood, that the user will select (e.g., access) the content item. Such probabilities can be determined using a trained machine learning model that predicts a likelihood of the user selecting a content item, for example, based, in part, on various interactions of the user with content items. Such interactions can include, for example, selecting a link in the content item, commenting on the content item, endorsing or "liking" the content item, sharing the content item with other entities (e.g., other users of the social networking system, social connections or "friends", etc.), and hiding the content item. In some embodiments, the predicted likelihood may also be based, in part, on the user's interests, any types (e.g., articles, videos, etc.) content items preferred by the user, any topics (e.g., fashion, funny, etc.) of content items that are preferred by the user, and/or the entity (e.g., user, publisher, page, etc.) that is sharing, or providing, the content item. In some embodiments, a determination to pre-fetch content items can be based on data costs and/or the data connection quality (e.g., Internet connection) of the computing device of the user. In such embodiments, pre-fetching can be disabled on computing devices that have a threshold connection quality. In some instances, such costs can be weighed against the predicted lag in obtaining content items when making the pre-fetching determination. In some embodiments, a user's previous view behavior can also be evaluated when determining a preview time threshold. For example, if the user's average view duration of content items is short in average (e.g., less than a threshold time duration), then the preview time threshold for that user can be reduced to a duration that is at or less than the threshold time duration. In some embodiments, the determination to pre-fetch and/or adjust the preview time threshold can be based on a user's behavior with respect to certain types of content items, as determined by the content items the user selected, or did not select, to view.

By intelligently pre-fetching, or downloading, content items before a user requests access to them, the approaches described herein can significantly enhance the user experience. However, there may be instances where pre-fetching of content items may not be optimal, such as when a computing device is low on battery. Thus, in various embodiments, the pre-fetch frequency module 310 can be configured to regulate (e.g., increase or decrease) the rate at which content items are pre-fetched. In some embodiments, the rate at which content items are pre-fetched can be regulated with respect to bandwidth constraints and/or the type of data connection being utilized by the computing device. For example, pre-fetching may be increased or decreased with respect to a data plan (e.g., amount of data able to be uploaded and/or downloaded without overages). In another example, the rate of pre-fetching may be reduced, for example, when the computing device is accessing a cellular data connection and increased, for example, when the computing device is accessing a WiFi data connection or a wired (e.g., Ethernet) data connection. In some embodiments, the rate at which content items are pre-fetched can be increased or decreased based at least in part on the CPU and/or power usage of the computing device. In one example, the rate of pre-fetching may be reduced when the computing device is relying on battery power and increased when the computing device is plugged into a power source. Additionally, in some embodiments, the rate of pre-fetching may be regulated with respect to the amount of disk space that is available on the computing device.

Figure 4:
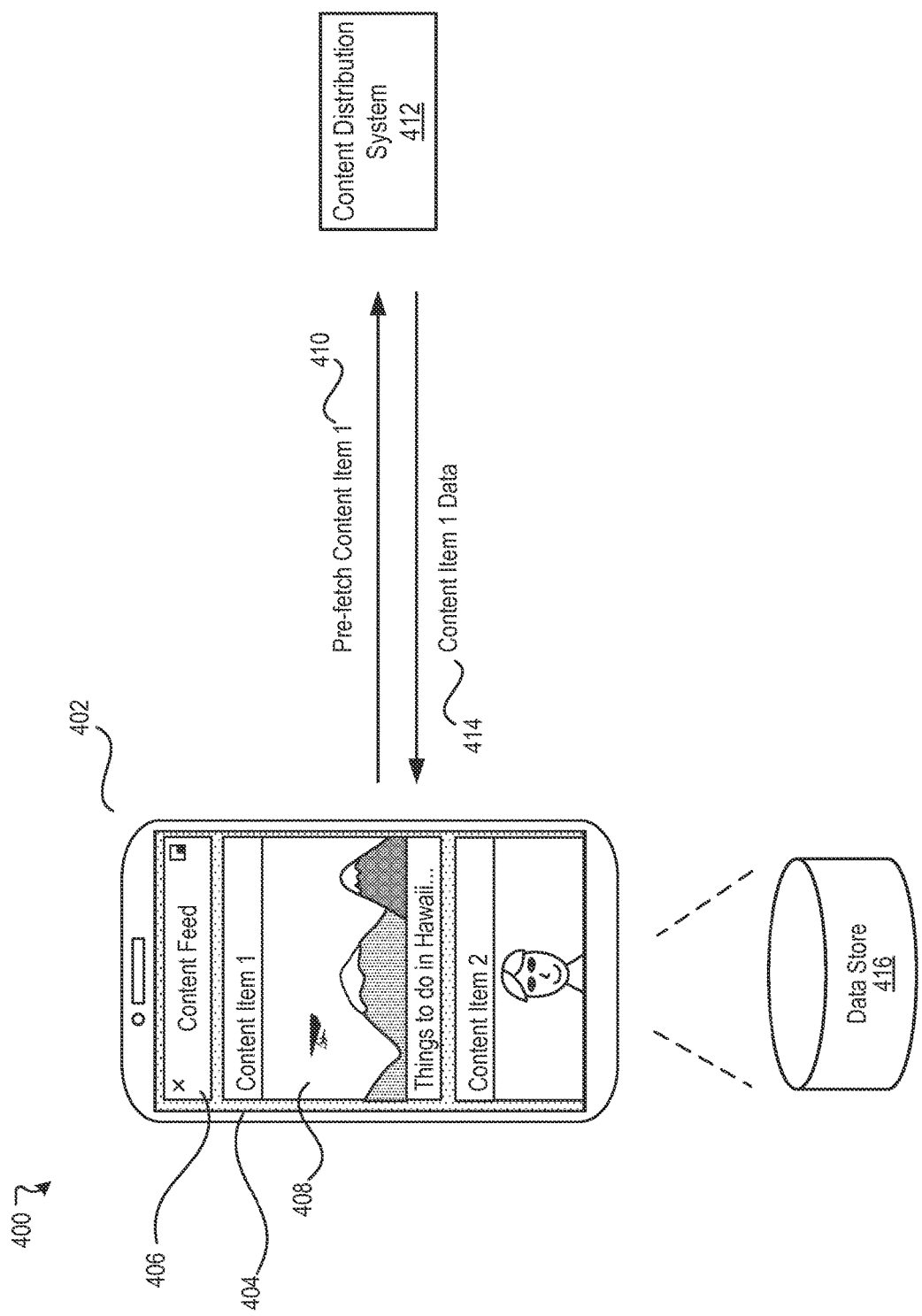
FIG. 4 illustrates an example of a diagram showing pre-fetching of a content item, according to an embodiment of the present disclosure.

FIG. 4 illustrates an example 400 of an interface 404 of a computing device 402 through which a snippet of a content item 408 is being presented in a content feed 406, according to an embodiment of the present disclosure. In this example, the interface 404 is presented on a display screen of the computing device 402. Further, the interface 404 may be provided through an application (e.g., a web browser, a social networking application, etc.) running on the computing device 402. In the example of FIG. 4, the snippet of the content item 408 is shown as being located in the viewport region of the interface 404. As mentioned, in various embodiments, data for the content item 408 can be pre-fetched when the snippet of the content item 408 is within the viewport region of the interface 404 for a duration of time that satisfies a preview time threshold associated with the content item 408.

In the example of FIG. 4, once the preview time threshold is satisfied, the computing device 402 can pre-fetch data for the content item from a content distribution system 412 that is sharing, or providing, the content item 410. The data 414 can include various markup language documents, executable code, static resources, and/or media associated with the content item 408 and such data can be used to render the content item 408 in its entirety through the interface 404. The data 414 obtained from the content distribution system 412 can be stored, for example, in a data store 416 associated with the computing device 402. When the user operating the computing device 402 selects, or attempts to access, the content item 408, the computing device can present on the interface 404 the pre-fetched data 414 for the content item 408 that is stored in the data store 416, rather than downloading the data from the content publisher system 412 at the time the user attempts to access the content item 408 in its entirety, for example, by selecting (e.g., clicking, performing a tap gesture, etc.) the snippet of the content item 408.

Figure 5:
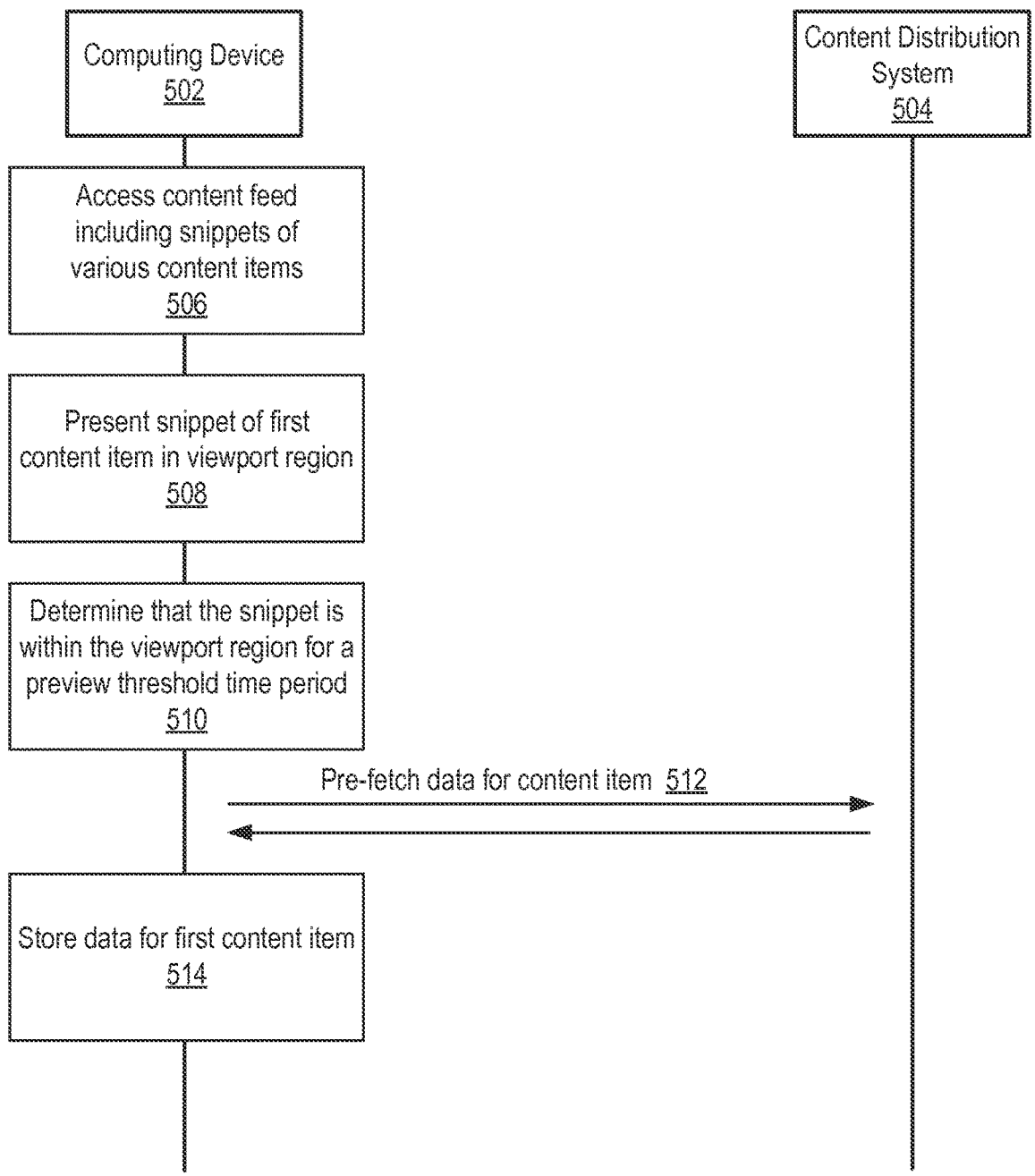
FIG. 5 illustrates an example diagram that depicts pre-fetching of a content item, according to an embodiment of the present disclosure.

FIG. 5 illustrates an example diagram 500 that depicts pre-fetching of a content item, according to an embodiment of the present disclosure. It should be appreciated that there can be additional, fewer, or alternative steps performed in similar or alternative orders, or in parallel, within the scope of the various embodiments discussed herein unless otherwise stated. In the example of FIG. 5, a user operating a computing device 502 is accessing a content feed in which snippets of various content items are presented 506. While accessing the content feed, a first content item in the feed may be positioned within a viewport region associated with the computing device 508. In various embodiments, the first content item may be associated with a preview time threshold that is used to determine when to pre-fetch data associated with the first content item. After it has been determined that the snippet of the first content item has been positioned within the viewport region for a duration of time that satisfies the preview time threshold 510, the computing device can pre-fetch data associated with the first content item from the content distribution system 504 that is providing the first content item in complete (e.g., the entire first content item rather than just a snippet of the first content item) 512. The pre-fetched data for the first content item can be stored on the computing device and be used to present the first content item in its entirety on the computing device once the user operating the computing device requests access to the first content item.

Figure 6:
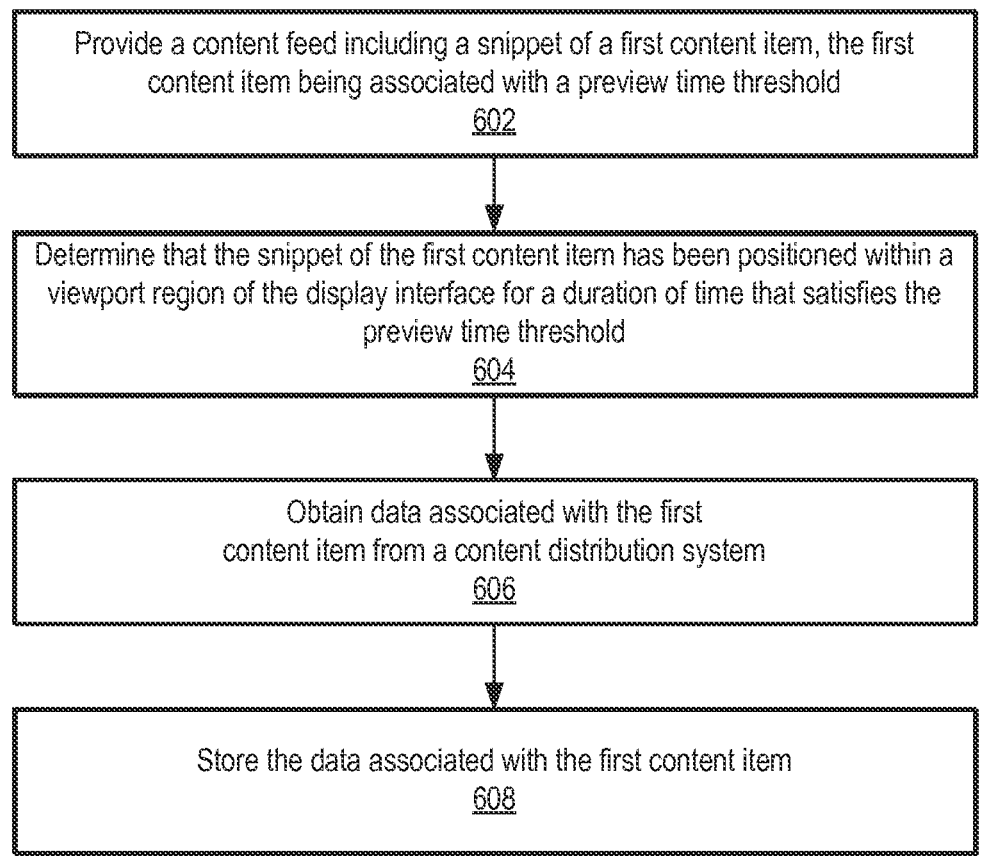
FIG. 6 illustrates an example method for pre-fetching content items, according to an embodiment of the present disclosure.

FIG. 6 illustrates an example method 600 for pre-fetching content items, according to an embodiment of the present disclosure. It should be appreciated that there can be additional, fewer, or alternative steps performed in similar or alternative orders, or in parallel, within the scope of the various embodiments discussed herein unless otherwise stated. At block 602, the example method 600 can provide a content feed through a display interface. The content feed can include at least a snippet of a first content item that is associated with a preview time threshold. At block 604, a determination can be made that the snippet of the first content item has been positioned within a viewport region of the display interface for a duration of time that satisfies the preview time threshold. At block 606, data associated with the first content item can be obtained from a content distribution system. At block 608, the data associated with the first content item can be stored.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 7:
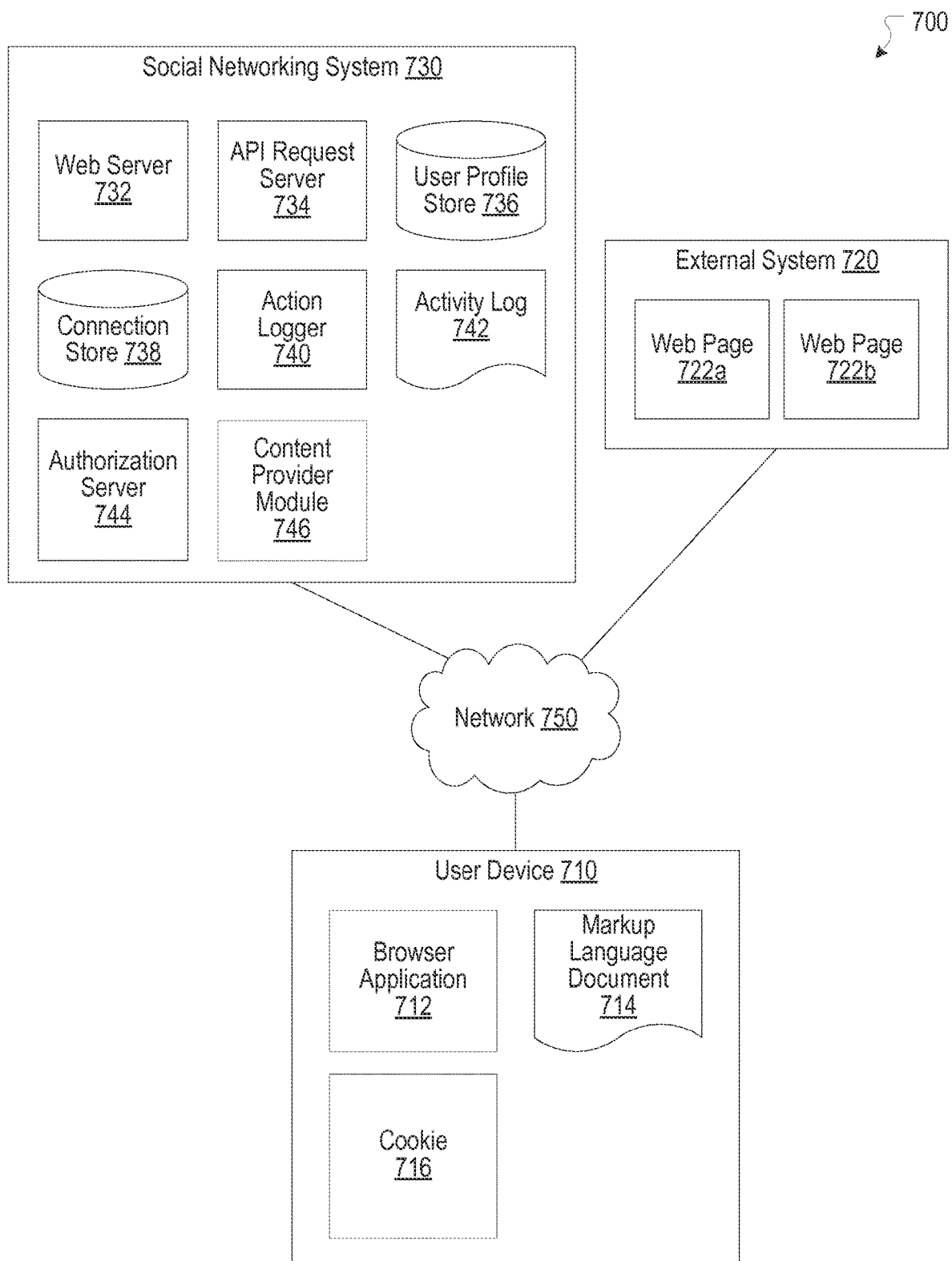
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the Silverlight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content. As discussed previously, it should be appreciated that there can be many variations or other possibilities.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the social networking system 730 can include a content provider module 746. The content provider module 746 can, for example, be implemented as the content provider module 102 of FIG. 1. As discussed previously, it should be appreciated that there can be many variations or other possibilities.

Hardware Implementation

Figure 8:
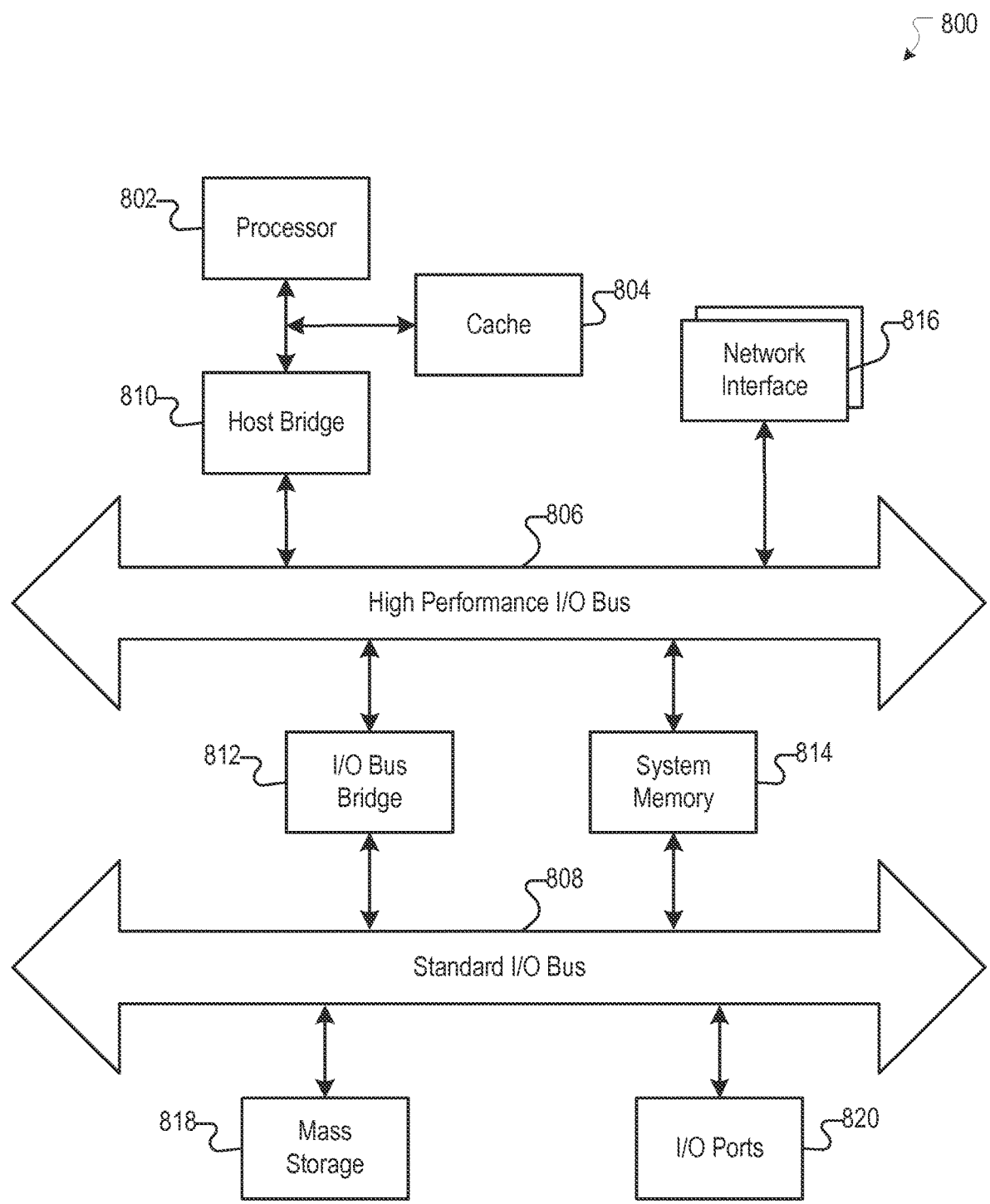
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   obtaining, by a computing device, a first preview time threshold for a first content item to be presented to a user, wherein the first preview time threshold is based at least in part on text and media associated with the first content item and an average view duration associated with the user;
   providing, by the computing device, for presentation to the user, a content feed through a display interface, wherein the content feed includes at least a first snippet of the first content item;
   determining, by the computing device, that the first snippet of the first content item has been positioned within a viewport region of the display interface for a duration of time that satisfies the first preview time threshold;
   prefetching, by the computing device, the text associated with the first content item without the media associated with the first content item from a content distribution system; and
   storing, by the computing device, the text associated with the first content item.

2. The computer-implemented method of claim 1, the method further comprising:
   receiving, by the computing device, a selection of the first snippet of the first content item; and
   presenting, by the computing device, the first content item through the display interface based at least in part on the stored text associated with the first content item.

3. The computer-implemented method of claim 1, wherein the first preview time threshold is further based at least in part on a likelihood that the user will select the first snippet of the first content item to access the first content item.

4. The computer-implemented method of claim 1, wherein the first preview time threshold for the first content item is further based at least in part on whether a topic associated with the first content item corresponds with one or more preferred topics associated with the user.

5. The computer-implemented method of claim 1, wherein the content feed includes a second snippet of a second content item that is associated with a second preview time threshold, wherein the second preview time threshold is different from the first preview time threshold.

6. The computer-implemented method of claim 1, wherein the prefetching includes obtaining the text associated with the first content item prior to the user selecting the first snippet of the first content item to access the first content item.

7. The computer-implemented method of claim 1, the method further comprising:
- determining, by the computing system, that the text associated with the first content item is used least recently among other stored data associated with different content items; and
- removing, by the computing system, the text associated with the first content item from storage.

8. The computer-implemented method of claim 1, the method further comprising:
- determining, by the computing system, that the text associated with the first content item has been stored for a threshold period of time; and
- removing, by the computing system, the text associated with the first content item from storage.

9. The computer-implemented method of claim 1, wherein the viewport region is defined by a specified set of pixel coordinates that correspond to the display interface.

10. The computer-implemented method of claim 1, the method further comprising:
- determining, by the computing device, a type of data connection through which the content feed is being accessed; and
- adjusting, by the computing device, a rate of obtaining data associated with content items prior to the content items having been accessed through the computing device.

11. A system comprising:
at least one processor; and
a memory storing instructions that, when executed by the at least one processor, cause the system to perform:
- obtaining a first preview time threshold for a first content item to be presented to a user, wherein the first preview time threshold is based at least in part on text and media included in the first content item and an average view duration associated with the user;
- providing, for presentation to the user, a content feed through a display interface, wherein the content feed includes at least a first snippet of the first content item;
- determining that the first snippet of the first content item has been positioned within a viewport region of the display interface for a duration of time that satisfies the first preview time threshold;
- prefetching the text included in the first content item without the media included in the first content item from a content distribution system; and
- storing the text included in the first content item.

12. The system of claim 11, wherein the instructions further cause the system to perform:
- receiving a selection of the first snippet of the first content item; and
- presenting the first content item through the display interface based at least in part on the stored text associated with the first content item.

13. The system of claim 11, wherein the first preview time threshold is further based at least in part on a likelihood that the user will select the first snippet of the first content item to access the first content item.

14. The system of claim 11, wherein the first preview time threshold for the first content item is further based at least in part on one or more interests of the user.

15. The system of claim 11, wherein the content feed includes a second snippet of a second content item that is associated with a second preview time threshold, wherein the second preview time threshold is different from the first preview time threshold.

16. A non-transitory computer-readable storage medium including instructions that, when executed by at least one processor of a computing system, cause the computing system to perform a method comprising:
- obtaining a first preview time threshold for a first content item to be presented to a user, wherein the first preview time threshold is based at least in part on text and media associated with the first content item and an average view duration associated with the user;
- providing, for presentation to the user, a content feed through a display interface, wherein the content feed includes at least a first snippet of the first content item;
- determining that the first snippet of the first content item has been positioned within a viewport region of the display interface for a duration of time that satisfies the first preview time threshold;
- prefetching the text associated with the first content item without the media associated with the first content item; and
- storing the text associated with the first content item.

17. The non-transitory computer-readable storage medium of claim 16, wherein the instructions further cause the computing system to perform:
- receiving a selection of the first snippet of the first content item; and
- presenting the first content item through the display interface based at least in part on the stored text associated with the first content item.

18. The non-transitory computer-readable storage medium of claim 16, wherein the first preview time threshold is further based at least in part on a likelihood that the user will select the first snippet of the first content item to access the first content item.

19. The non-transitory computer-readable storage medium of claim 16, wherein the first preview time threshold for the first content item is further based at least in part on one or more interests of the user.

20. The non-transitory computer-readable storage medium of claim 16, wherein the content feed includes a second snippet of a second content item that is associated with a second preview time threshold, wherein the second preview time threshold is different from the first preview time threshold.

* * * * *